June 12, 1956

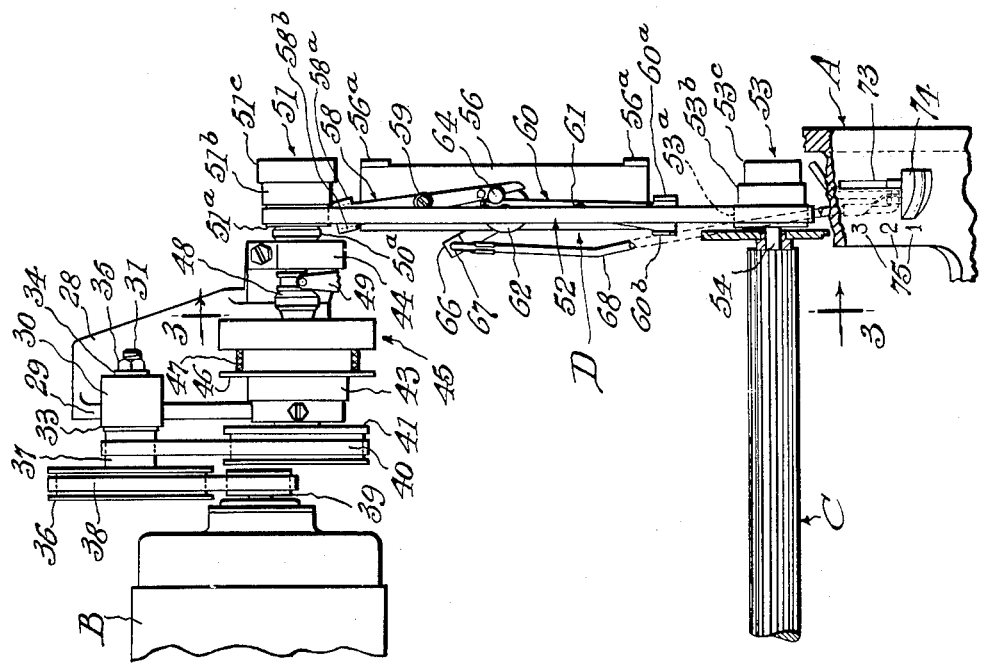

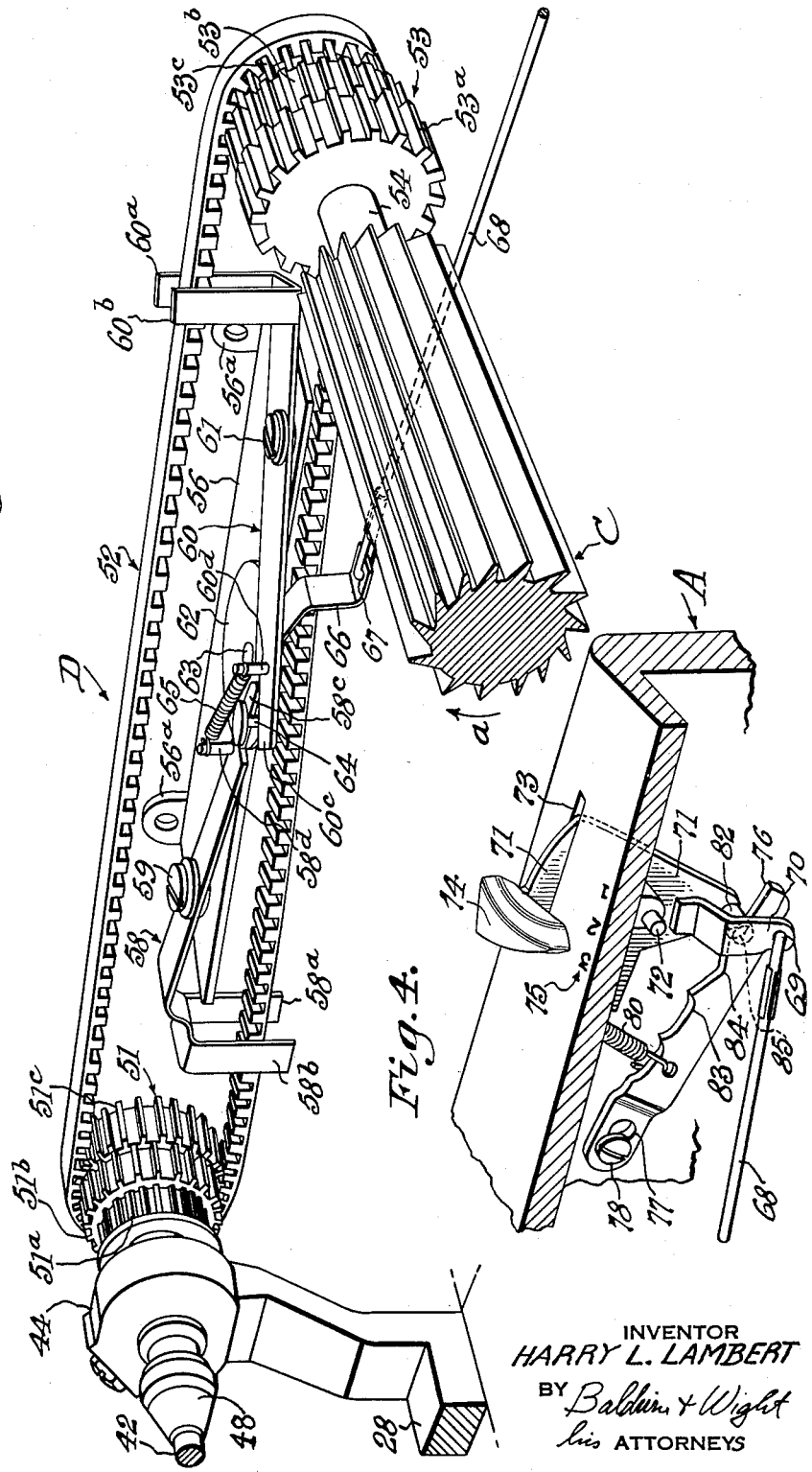

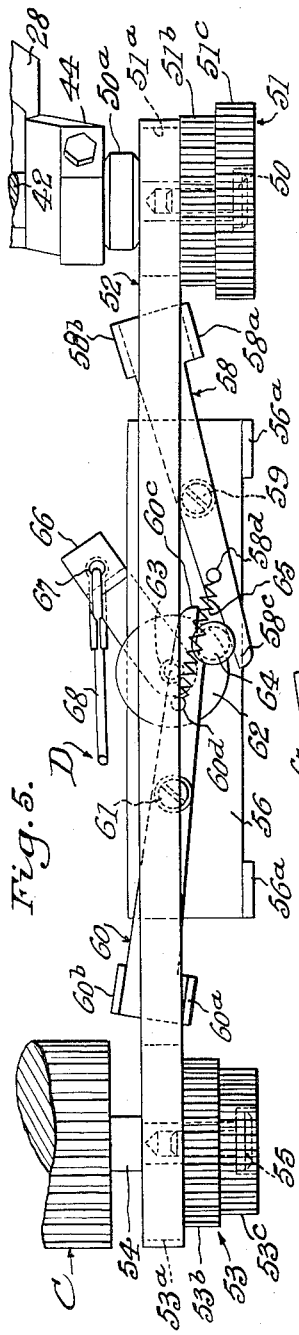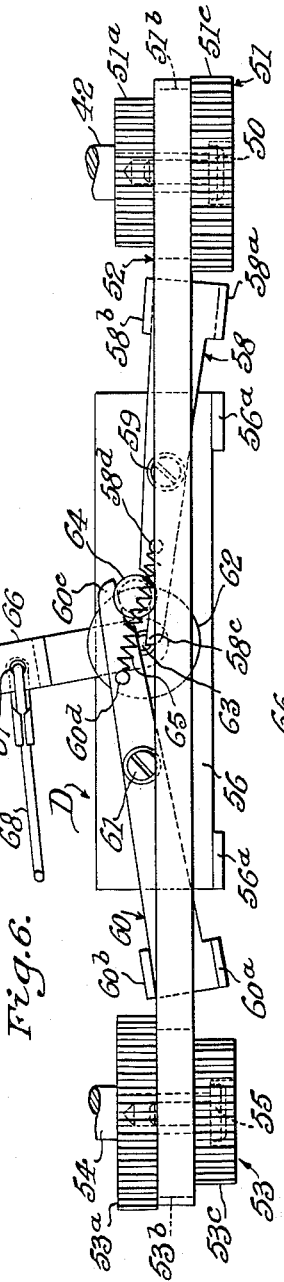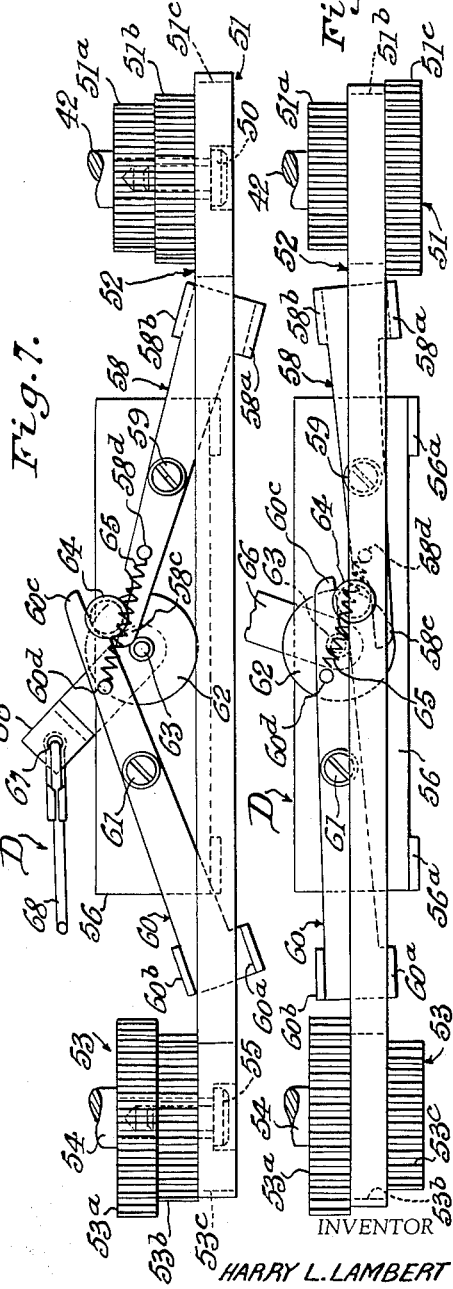

H. L. LAMBERT 2,749,762

VARIABLE SPEED PULLEY AND BELT DRIVING MECHANISM

Filed Sept. 30, 1954

INVENTOR
HARRY L. LAMBERT

BY Baldwin & Wight
his ATTORNEYS

United States Patent Office 2,749,762
Patented June 12, 1956

2,749,762

VARIABLE SPEED PULLEY AND BELT DRIVING MECHANISM

Harry L. Lambert, West Hartford, Conn., assignor to Royal McBee Corporation, New York, N. Y., a corporation of New York Application September 30, 1954, Serial No. 459,226

15 Claims. (Cl. 74—242.4)

This invention relates to variable speed pulley and belt driving mechanism, and more particularly to mechanism of this kind including means for shifting and determining the positions of a flexible belt with relation to the different diameter portions of stepped driving and driven pulleys.

A well known type of variable speed pulley and flexible belt driving mechanism includes two stepped pulley structures rotatable about spaced parallel axes and having portions of different diameters, and a flexible belt adapted to be trained around selected portions of the pulleys and to be shifted to engage other selected portions of different diameter ratios according to the driving speed ratio desired.

An object of the present invention is to provide improved belt shifting and position determining equipment or means for or in combination with such belt driving mechanism.

Another object of the invention is to provide mechanism of the class referred to including improved means for actuating belt shifter parts engageable with the belt edges for forcing or guiding the belt from engagement with two portions of the driving and driven pulleys respectively to engage two other portions of the pulleys.

A further object of the invention is to provide improved control and belt position determining means for operating the shifter actuating means and accurately determining the amount of movement to be imparted to the actuating means according to the movement thereof required to close any clearance between the belt shifter means and the belt and then to move the belt to the adjacent two pulley portions.

Other objects will become apparent from a reading of the following description, the appended claims, and the accompanying drawings, in which:

Figure 2 is a fragmentary top plan view of drive transmitting mechanism shown in Figure 1, with certain parts shown in section, this view being on a reduced scale as compared to Figure 1;

Figure 3 is a fragmentary perspective view drawn on an enlarged scale with certain parts shown in section on the line 3—3 of Figure 2;

Figure 4 is a fragmentary perspective view of the details of a speed control lever and associated detent mechanism, a frame part being shown in section;

Figure 5 is a top plan view of a belt shifting mechanism and only certain parts of an associated belt driving means and a typewriter operating member, the parts being shown in the relative positions occupied when transmitting slow speed drive to the typewriter operating member;

Figure 6 is a view similar to Figure 5 but showing the parts in the relative positions occupied after a driving belt has been shifted from low speed driving position to medium speed driving position;

Figure 7 is a view similar to Figure 5 but showing the positions occupied by the parts after the belt has been shifted from medium speed driving position to high speed driving position;

Figure 9:
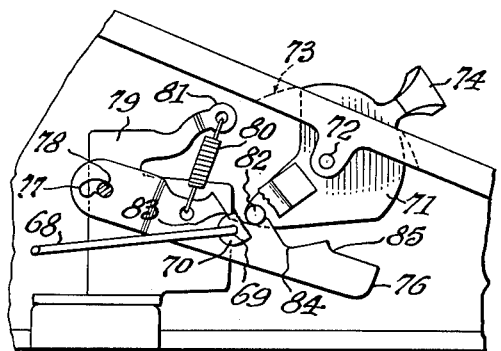
Figure 10:
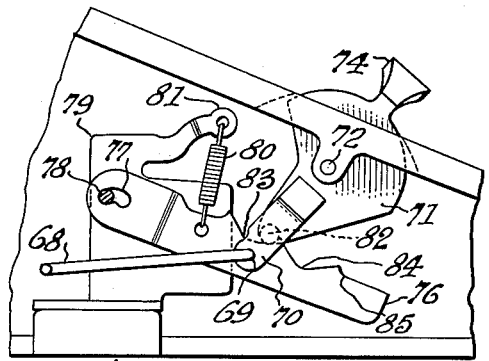
Figure 11:
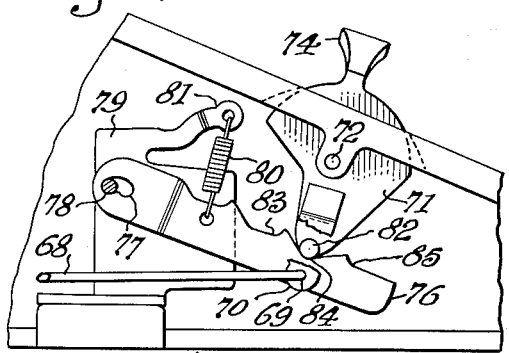
Figure 12:
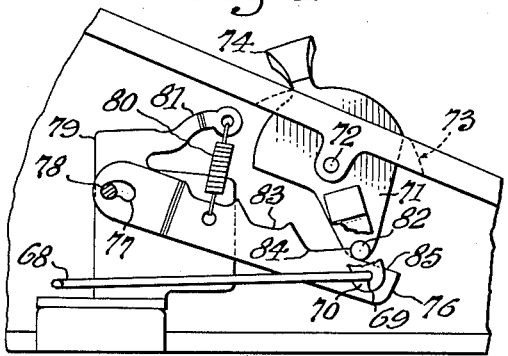
Figure 13:
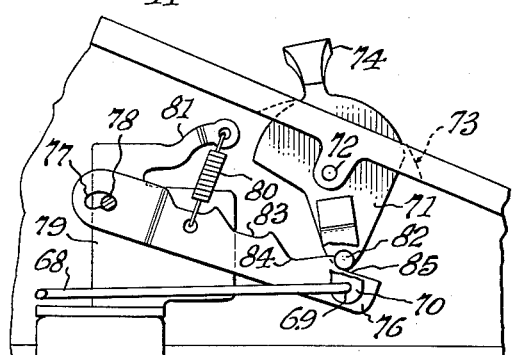
Figure 14:
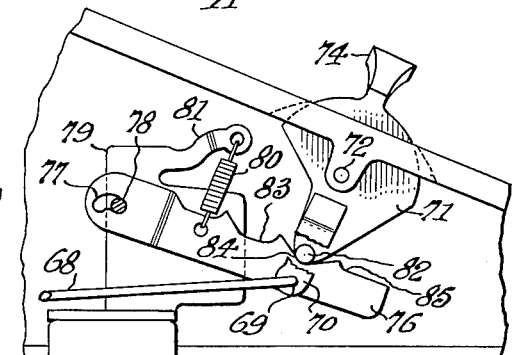

Figure 8 also is a view similar to Figure 5 but showing the relative positions of the parts after the belt has been shifted from high speed position to medium speed position;

Figure 9 is a fragmentary elevation view of the speed control lever and detent mechanism illustrated in Figure 4, but showing the parts in the positions they occupy after the lever has been operated to shift the belt from medium speed position to low speed position;

Figure 10 is a view similar to Figure 9 but showing the parts in the positions they occupy following a preliminary movement of the control lever from low speed position toward medium speed position but prior to effective shifting of the belt to medium speed position;

Figure 11 is a view similar to Figure 9 but showing the positions occupied by the parts after shifting the belt from low speed position to medium speed position;

Figure 12 also is a view similar to Figure 9 but showing the positions occupied by the parts after the belt has been shifted from medium speed position to high speed position;

Figure 13 is a view similar to Figure 9 but showing the parts in the positions they occupy following a preliminary movement of the control lever from its high speed position towards its medium speed position but before effective shifting of the belt from its high speed position to its medium speed position; and Figure 14 is a view similar to Figure 9 and showing the parts in the positions they occupy following a shifting of the belt from its high speed position to its medium speed position.

Mechanism in accordance with the invention is illustrated as being embodied in an electric typewriter including a frame A on which is mounted a motor B adapted to drive a rotary operating member C through a belt drive mechanism D. The operating member C is constituted by a snatch roll of known form journalled in any suitable manner for rotation on the main frame A. The snatch roll C is adapted to operate various typewriter instrumentalities such for example as the type bars, the case shifting mechanism, the back spacing mechanism, the tabulating mechanism, and the line spacing and carriage returning mechanisms. For the purposes of illustration, the snatch roll C is shown as being operable for actuating a type bar 1 pivoted at 2 in the usual manner on a type bar segment 3, the type bar 1 being swingable clockwise about the pivot 2 to bring its type head into printing position with relation to a cylinder or platen (not shown) supported in the usual manner on a carriage 4 which is mounted for letter spacing and return travel by means including anti-friction balls 5 arranged to run on a track rail 6 secured to the main frame A.

Mechanism for transmitting power from the snatch roll C to the type bar 1 includes a pawl carrier or actuator 7 pivoted at its rear end at 8 on a lever 9 the lower end of which is pivoted at 10 on the frame A. A pawl 11 is pivoted at 12 on the actuator 7 and is urged clockwise by a spring 13 interposed between the pawl and the actuator so as to tend to bring the pawl nose 14 into engagement with the snatch roll. Normally, the pawl 11 is held in the inoperative position shown in Figure 1 by a trigger 15 pivoted at 16 on the actuator 7 and having a nose 17 which engages the pawl nose 14 and holds the latter disengaged from the snatch roll C. A spring 18 interposed between the trigger 15 and the actuator 7 normally maintains the trigger in the pawl disabling position.

In order to effect an operation of the type bar 1 by power delivered by the constantly rotating snatch roll C, a key controlled lever 19 is rocked clockwise so as to move its rear end downwardly and to transmit downward thrust through a flipper 20 pivoted at 21 on the rear end of the lever 19. The lower end of the flipper 20 is disposed above an ear 22 on the forward end of the trigger 15, the flipper 20 normally being held in such position by a spring 23 interposed between the flipper and the lever 19 and urging the flipper clockwise to a limit position determined by engagement of a flipper heel or projection 24 with an ear 25 on the lever 19.

In operation, when the rear end of the lever 19 and the flipper 20 are moved downwardly the flipper pushes against the ear 22 so as to rock the trigger 15 counterclockwise, thereby elevating the trigger nose 17 and disengaging it from the pawl nose 14. This permits the pawl spring 13 to rock the pawl 11 clockwise and to bring the pawl nose 14 into engagement with the toothed snatch roll C which then is rotating constantly in the direction of the arrow $a$ in Figure 3. Consequently the pawl 11 and the actuator 7 will be moved forwardly by the snatch roll, rocking the lever 9 counterclockwise and pulling forwardly a link 9$^a$ interposed between the top of the lever 9 and a heel 1$^a$ on the type bar 1. This will move the type bar clockwise about its pivot 2 and into printing position. When the momentum of the actuator 7 and associated parts throws the pawl nose 14 forwardly and clear of the snatch roll C the actuator 7 will be raised or swung clockwise about its pivot 8 and will then be returned rearwardly by normalizing spring mechanism not shown, thus restoring the parts to their normal positions. The flipper 20 is pivoted and is spring held as shown in Figure 1 in order to enable the trigger 15 to be returned to its normal position without interference if the lever 19 is inadvertently held in operative position instead of being returned to normal position immediately after being operated.

The extent to which the individual actuator 7 is driven by the snatch roll, and consequently the force of the typing impact exerted by the associated type bar may be changed by varying the extent to which the pawl nose 14 moves downwardly into the tooth interspaces on the snatch roll C. To provide for such an adjustment the actuator 7 is formed with a finger 26 and the pawl 11 is formed with a finger 27 which is adapted to engage the finger 26 when the trigger 15 is operated to release the pawl 11, engagement of the finger 27 with the finger 26 limiting the depth to which the pawl nose 14 may move downwardly into a tooth interspace. By bending one of the fingers 26—27 or otherwise varying the proximity of one to the other when the parts are in their normal or inactive positions as shown in Figure 1 the limiting effect of the stop finger 26 on the rocking of the pawl 11 may be adjusted.

The present invention is more particularly concerned with mechanism for varying the speed with which an element or member driven by a belt is operated, and while mechanism embodying the invention may be used to advantage for variably driving the common operating member of a typewriting machine, such as the snatch roll C for determining the nature of operation of the various typewriter instrumentalities, the mechanism is capable of being used for other purposes.

Figure 1:
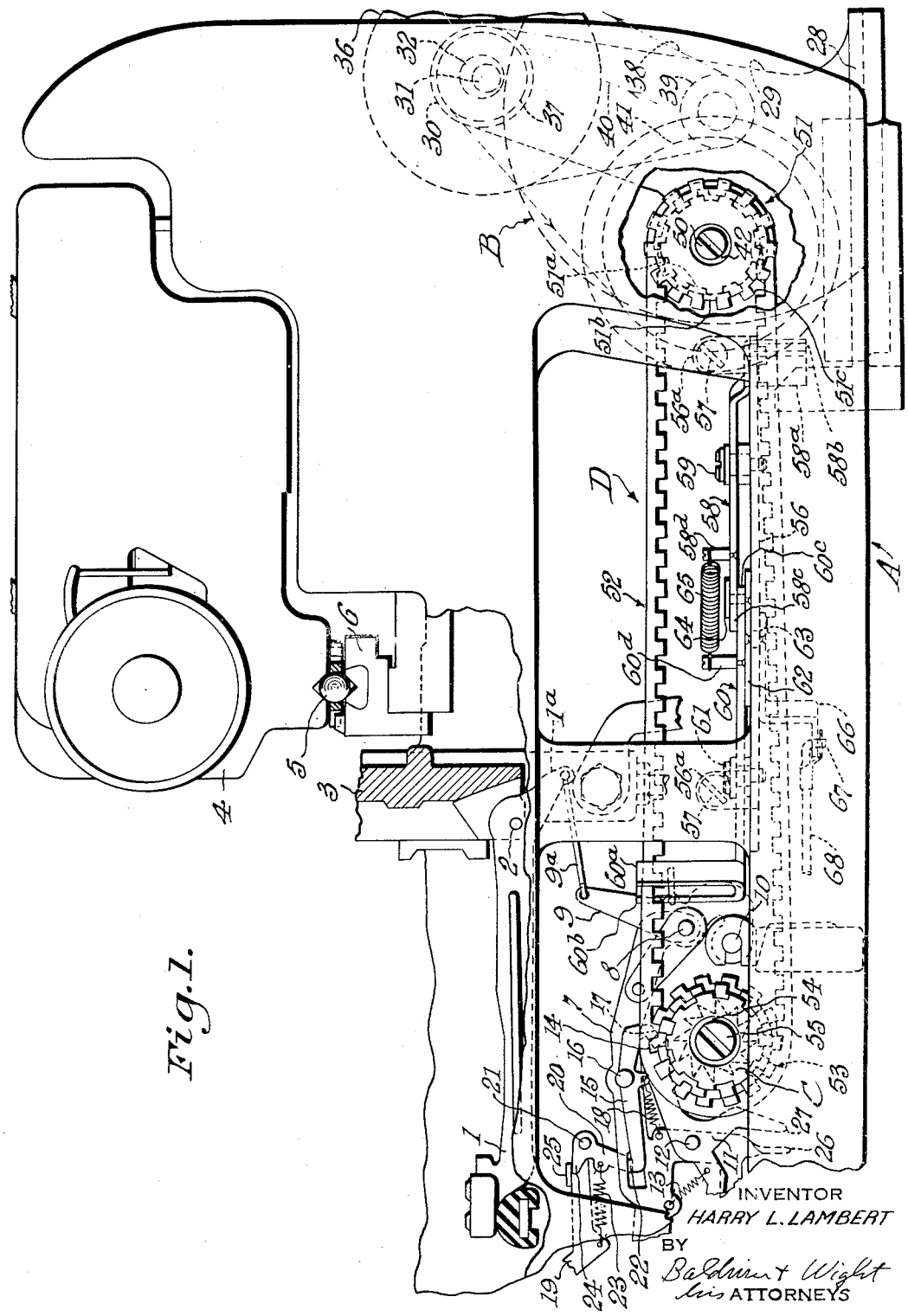
Figure 1 is a fragmentary side elevation of an electric typewriter embodying the invention, some parts being shown in section.

In the illustrated embodiment of variable speed driving mechanism disclosed by way of example and in a preferred form a bracket 28 mounted on the main frame A is formed with an upstanding part 29 surmounted by a boss 30 which carries a shaft 31, the shaft having an eccentric portion 32 shown in Figure 1 received in an aperture in the boss 30. The shaft also is equipped with a flange or enlarged part 33 which abuts the left face of the boss 30 and cooperates with a washer 34 and nut 35 screwed onto the threaded end of the shaft 31 for securing the shaft in place on the boss 30.

Journalled on the shaft 31 is a pulley assembly comprising integral or unitary pulleys 36 and 37 the larger 36 of which is drivingly connected by a belt 38 to a pulley 39 on the shaft of the motor B. A belt 40 is trained around the smaller pulley 37 of the pulley assembly 36—37 and a pulley 41 which is fast with a shaft 42 journalled to rotate on standards 43 and 44 on the bracket 28. The arrangement is such that the motor B drives through the belt 38, the pulley assembly 36—37, the belt 40 and the pulley 41 to rotate the shaft 42 constantly with a substantial speed reduction. The tension of the belts 38 and 40 may be varied by adjusting the angular position of the shaft 31 and its eccentric portion 32 with respect to the boss 30.

Figure 2 shows a carriage returning driving clutch assembly, generally designated 45 and including a winding drum 46 attached to which is a carriage returning draw band 47. The clutch mechanism 45 includes a clutch operating cone 48 adapted to be moved by a forked lever 49. Details of the clutch 45, the associated carriage returning mechanism, and the mechanism for operating the lever 49 are disclosed in more detail in the patent to Hart 2,573,197, dated October 30, 1951.

Secured to the outer or right hand end of the shaft 42 as viewed in Figure 2 by a screw 50 is a three step power driven pulley 51 which, like the shaft 42, is constantly driven by power delivered by the motor B. An end play preventing bearing 50$^a$ is interposed between the pulley 51 and the bearing standard 44. The pulley 51 comprises adjacent concentric portions 51$^a$, 51$^b$ and 51$^c$ which are respectively of smaller, intermediate, and larger diameters. Selected diameter portions of the pulley 51 are adapted to drive an endless flexible belt 52 which in turn drives a stepped drivable pulley 53 secured to the shaft 54 of the snatch roll C by a screw 55 as shown in Figure 1 and being thus journalled to rotate about an axis spaced from the axis of the pulley 51. The pulley 53 is constituted by adjacent concentric portions 53$^a$, 53$^b$ and 53$^c$ which are of larger, intermediate, and smaller diameters, aligned respectively with the portions 51$^a$, 51$^b$, and 51$^c$ of smaller, intermediate and larger diameters, of the pulley 51. When the belt 52 is trained around the pulley portions 51$^a$ and 53$^a$ the snatch roll C will be driven at relatively low speed, when the belt 52 is trained around the pulley portions 51$^b$ and 53$^b$ the snatch roll will be driven at medium speed, and when the belt 52 is trained around the pulley portions 51$^c$ and 53$^c$ the snatch roll will be driven at relatively high speed.

The pulleys 36, 37, 39, 41, 51 and 53 and the belts 38, 40 and 52 may be of any suitable kind; but preferably the pulleys and belts are formed with lugs or teeth to prevent slippage. Mechanism for shifting the belt 52 to any of its three selected positions is carried by a plate 56 formed with ears 56$^a$ for receiving screws 57 by which the plate is secured to the main frame A. The shifting mechanism includes a shifter arm 58 pivoted on a pin or mounting means 59 on the plate 56 to rock about an axis fixed with respect to the axes of the pulleys 51 and 53. The arm 58 is formed with downwardly extending shifter fingers 58$^a$ and 58$^b$ which project adjacent to opposite sides of the lower stretch of the belt 52 contiguous to the pulley 51. A second shifter arm 60 is pivoted on a pin or mounting means 61 on the plate 56 to rock about an axis fixed with respect to the axes of the pulleys 51 and 53. The arm 60 is formed with upwardly extending shifter fingers 60$^a$ and 60$^b$ which project adjacent to opposite sides of the upper stretch of the belt 52 contiguous to the pulley 53. The shifter 58 has an operating part 58$^c$ which extends towards the pulley 53, and the shifter 60 has an operating part 60$^c$ which extends towards the pulley 51 and alongside the operating part 58$^c$.

Actuating mechanism or equipment for operating the shifters 58 and 60 includes a disc member 62 mounted to rock on the pintle 63 carried by the plate 56. Secured to and extending upwardly from the disc 62 is a pin element 64 which projects between the mutually overlapping operating parts 58$^c$ and 60$^c$ of the shifter arms 58 and 60. A coiled tensile spring means 65 interposed between pins 58ᵈ and 60ᵈ secured respectively to the arms 58 and 60 draws the operating parts 58c and 60c towards each other and yieldingly maintains each in contact with the pin element 64.

In the operation of the mechanism as described so far, rocking of the disc 62 is effective for shifting the belt 52 selectively to any one of its three positions, viz.: high speed, medium speed or slow speed. Figure 5 shows the parts in the slow or low speed positions with the belt 52 trained around the smaller diameter portion 51ᵃ of the power driven pulley 51 and the larger diameter portion 53ᵃ of the drivable pulley 53. In order to shift the belt 52 to its medium speed position, the disc 62 is rocked counterclockwise as viewed in Figure 5 so as to cause the pin 64 to press positively against the operating part 60ᶜ of the shifter arm 60 and rock the latter counterclockwise, thereby causing the finger 60ᵇ to press against the belt 52 and urge or ease the belt outwardly so that it may drop onto the intermediate diameter pulley portion 53ᵇ of the pulley 53. During this rocking of the disc 62, the pin 64 will tend to move away from and hence will not exert pressure on the operating part 58ᶜ of the shifter arm 58. At this time the spring 65 will exert impositive force on the arm 58 so as to urge the latter clockwise to cause its finger 58ᵇ to press against the lower stretch of the belt 52. Because of the impositive rocking of the finger 58 through the spring 65, the movement of the arm 58 will be delayed slightly with respect to the movement of the arm 60 but finally will take place so as to guide the lower stretch of the belt and cause the latter to climb, so to speak, from the small diameter pulley portion 51ᵃ to the intermediate diameter pulley portion 51ᵇ. Similarly, when the disc 62 is rocked from its Figure 6 position to its Figure 7 position, the arm 60 will be positively rocked so as first to move the belt 52 from the pulley portion 53ᵇ to the pulley portion 53ᶜ, followed by impositive rocking of the arm 58 to move the opposite end of the belt from the pulley portion 51ᵇ to the pulley portion 51ᶜ. Conversely, when the disc 62 is rocked clockwise, the shifter arms 58 and 60 will be rocked oppositely to move the belt from its high speed position to its intermediate speed position, and from its intermediate speed position to its low speed position. In shifting the belt from high to intermediate and from intermediate to low speed positions it is the arm 58 which is driven positively by the pin 64 and it is the arm 60 which is impositively driven.

In accordance with the invention, improved mechanism is provided for operating the rockable member or disc 62 to shift the belt 52 to any one of its selected positions referred to above, and shifter position determining means is provided for establishing definitely the positions to which the shifter arms 58 and 60 are moved for determining the selected positions of the belt 52. In the form shown, the disc 62 is provided with an arm 66 which is connected at 67 to the rear end of a link 68, the front end of which is connected at 69 to a leaf or ear 70 on a control lever member 71. The lever 71 is pivoted on a pin 72 and extends upwardl through a slot 73 in the frame A, the upper end of the lever being equipped with a finger piece 74 formed with a pointer for registering with indicia 75 comprising the speed indicating numerals "1"—"2"—"3", as shown in Figure 4. By swinging the finger lever 71 to bring its finger piece pointer 74 into registration with a selected one of the indicia "1"— "2" or "3" the belt 52 may be placed accordingly and selectively in its low speed, medium speed, or high speed position, movement of the control lever 71 being transmitted through the link 68 to the arm 66 and hence to the rockable disc 62.

Differentially operable detent mechanism for establishing the correct position of the control lever 71 according to the position which the belt is to occupy for determining a selected speed includes a detent lever member 76 formed at its rear end with a kidney-shaped slot 77 which receives a pin 78 fixed to a bracket 79 secured to the main frame A. A spring 80 is connected between the lever 76 and an arm 81 on the bracket 79 for urging the lever 76 counterclockwise about the pin 78 and into contact with a stud or pin 82 on the lower end of the lever 71.

The slot 77 extends generally in the direction of the major axis of the lever 76 and transversely to the line of action of the spring 80 so as to permit the lever 76 to partake of a bodily or linear fore and aft movement in addition to its pivotal movement for accomplishing a purpose to be described later. The kidney-shape of the slot 77, while permitting the bodily fore and aft movement referred to, yieldingly tends to maintain the lever in the position to which it has been shifted, but permits bodily shifting of the lever under certain conditions hereinafter explained.

The detent lever 76 is formed with three seats 83, 84 and 85 adapted to receive the pin 82 on the lever 71 when the latter is respectively in its low speed, medium speed and high speed positions. The bodily shifting of the detent lever 76 is utilized in the manner set forth below in describing the operation of the mechanism, for causing increased movement of the shifter arms 58 and 60 to take place in instances in which the shifter arms must take up clearances between the shifter fingers and the belt preliminarily to exerting pressure on the belt for shifting the latter.

*Operation*

Assuming that the belt 52 has been shifted from its medium speed driving position to its low speed driving position, the belt and shifter arms 58 and 60 will be in the relative positions shown in Figure 5, and the lever 71 and detent lever 76 will be in the positions shown in Figure 9. In these positions of the parts the stud or pin 82 on the lever 71 will be in engagement with the detent seat 83, and the detent lever 76 will be in its rearmost position with the forward end of the kidney-shaped slot 77 receiving the pin 78. At this time, there will be considerable clearances between the shifter fingers 58ᵇ and 60ᵇ and the adjacent edge of the belt 52. To shift the belt 52 to its medium speed position as shown in Figure 6, the control lever 71 is first given a small preliminary counterclockwise rocking movement from the position shown in Figure 9 to the position shown in Figure 10. The spring 80 will hold the detent lever 76 up with sufficient force to prevent the stud 82 on the lever 71 from camming the hump or projection between the seats 83 and 84 so that the stud 82 will remain on the seat 83, but, nevertheless, will shift the detent lever 76 bodily and linearly forwardly, or to the right as viewed in Figure 9, until the left end of the slot 77 engages the pin 78 as shown in Figure 10 after which there can be no further bodily movement of the detent lever 76. This small preliminary rocking of the lever 71 will act through the link 68 to rock the disc 62 sufficiently to rock the arms 58 and 60 enough to take up the clearances between the shifter fingers 58ᵇ, 60ᵇ and the belt 52. This will take place before the finger piece 74 has moved from position "1" to position "2" shown in Figure 4. Further counterclockwise rocking of the lever 71 will cause the stud 82 to cam downwardly the hump between the seat 83 and the seat 84 so that the stud 82 may then pass onto the seat 84, the parts then having arrived in the positions shown in Figure 11 at which time the finger piece 74 will register with the position indicator "2" in Figure 4. This will move the arms 58 and 60 further so that their fingers 58ᵇ and 60ᵇ will press against the belt 52 and shift it to its medium speed position, the parts then being in the positions shown in Figures 11 and 6.

Although, in describing the sequence of operations when shifting the belt from its low speed position to its medium speed position, reference has been made to a preliminary movement of the lever 71 from its Figure 9 position to its Figure 10 position and a further movement of the lever 71 from its Figure 10 position to its Figure 11 position, it will be understood that in actual use the lever 71 will ordinarily be moved continuously from its Figure 9 position through its Figure 10 position to its Figure 11 position without necessarily pausing in the Figure 10 position.

To move the belt to its high speed position, the lever 71 is rocked counter-clockwise from its Figure 11 position to its Figure 12 position. Since, at this time, the pin 78 contacts the rear end of the slot 77, the detent lever 76 cannot move bodily to the front and the stud 82 accordingly will cam the detent lever 76 downwardly and will ride over the hump between the seats 84 and 85 so as eventually to engage the seat 85. This will cause the shifter arms 58 and 60 to move from the positions shown in Figure 6 to the positions shown in Figure 7 so that the belt 52 will be shifted to its high speed position. Although the shifter arms are thus moved only a distance corresponding to the spacing of the detent seats 84 and 85, without an additional increment of movement corresponding to the length of the slot 77, the shifter arm movement is sufficient to shift the belt 52 from its Figure 6 position to its Figure 7 position because there are no substantial clearances between the shifter arm fingers 58ᵇ and 60ᵇ when the arms are in the positions shown in Figure 6.

When it is desired to move the belt from its high speed position to its medium speed position the control lever 71 is first given a preliminary clockwise movement from its "3" position shown in Figure 12 towards its "2" position. During this preliminary rocking of the lever 71 the stud 82 will force the detent lever 76 rearwardly until the right end of the slot 77 engages and is stopped by the pin 78, the parts then being in the positions shown in Figure 13. This will cause the shifter arms 58 and 60 to rock sufficiently to take up the clearances between the belt 52 and the shifter fingers 58ᵃ, 60ᵃ. The shifter arms 58, 60 will then be positioned as shown in Figure 7 with the exception that the fingers 58ᵃ and 60ᵃ will be just in contact with the belt 52. The effective shifting of the belt 52 from its high speed position to its medium speed position is accomplished by rocking the control lever 71 further clockwise to move the stud 82 over the hump between the detent seats 85 and 84 until the stud 82 is received by the seat 84 as shown in Figure 14. During this movement of the lever 71 the detent lever 76 will not move bodily but will only yield pivotally about the pin 78. The clockwise rocking of the lever 71 will bring its finger piece 74 into registration with the indicator numeral "2" and will move the shifter arms 58, 60 to the positions shown in Figure 8 to shift the belt 52 into its medium speed position in which it is trained around the pulley portions 51ᵇ, 53ᵇ.

To shift the belt from its intermediate position to its low speed position the control lever 71 is rocked from its Figure 14 position completely to its Figure 9 position. During this movement of the lever 71, the detent lever 76 cannot be shifted rearwardly because of the engagement of the front end of the slot 77 with the pin 78. Consequently, the lever 71 will partake of only sufficient rocking movement to enable the stud 82 to pass over the hump between the detent seats 84 and 83. This movement will be sufficient to rock the shifter arms 58, 60 from the positions shown in Figure 8 to the position shown in Figure 5 because when the arms are in their Figure 8 positions there are no substantial clearances between the belt 52 and the shifter fingers 58ᵃ, 60ᵃ.

When the belt is in its medium speed position, shown in Figure 6, following a shifting of the belt from its low speed or Figure 5 position to its intermediate speed position, there will be substantial clearances between the shifter fingers 58ᵃ, 60ᵃ and the belt 52. If the belt is then to be shifted back to its Figure 5 or low speed position the control lever 71 is rocked clockwise from its Figure 11 position to its Figure 9 position. During the first part of this rocking movement the detent lever 76 will be moved bodily rearwardly until the right end of the slot 77 engages the pin 78. This movement of the control lever 71 will be sufficient to rock the shifter arms 58 and 60 enough to close the clearances between the shifter fingers 58ᵃ, 60ᵃ and the belt 52. Continued clockwise rocking of the control lever 71 will cause the stud 82 to move onto the detent seat 83, the lever 71 then having arrived in the low speed position shown in Figure 9, and the shifter arms 58, 60 and the belt 52 having been moved to the low speed position shown in Figure 5.

When the belt 52 has been shifted from its high speed position shown in Figure 7 to its medium speed position shown in Figure 8, the shifter arms 58 and 60 will be so positioned that there will be substantial clearances between the shifter fingers 58ᵇ, 60ᵇ and the belt 52. If it then is desired to shift the belt back from its medium speed position to its high speed position, the control lever 71 is rocked counter-clockwise from its Figure 14 position towards its Figure 12 position. During the first part of this rocking of the lever 71 the detent lever 76 will move bodily forwardly until the rear end of the slot 77 engages the pin 78. This initial movement of the lever 71 will be sufficient to rock the shifter arms 58, 60 far enough to take up the clearances between the fingers 58ᵇ, 60ᵇ and the belt 52. Continued counter-clockwise rocking of the control lever 71 will cause the stud 82 to move onto the detent seat 85 and will rock the arms 58, 60 further to shift the belt from its medium speed position to its high speed position shown in Figure 7.

As will be clear from the foregoing description of operation, the operating mechanism including the control lever 71 and the detent lever 76, is adapted to effect greater shifting movement of the arms 58, 60 between two positions of the belt under conditions requiring that clearances between the belt and the shifter fingers be closed preliminarily to actual shifting of the belt than under conditions when there are no substantial clearances between the belt and the shifter fingers before the shifting operation is effected. The arrangement is such that when the belt is in its low speed position engaging the pulley end portions 51ᵃ and 53ᵃ more movement is imparted to the shifter arms 58 and 60 for shifting the belt to its medium speed position in engagement with the central pulley portions 51ᵇ and 53ᵇ than is imparted to the arms for shifting the belt from its medium speed position to its low speed position following a shifting of the belt from its high speed position to its medium speed position. Similarly, more movement of the arms 58 and 60 is effected for shifting the belt from its high speed position engaging the pulley end portions 51ᶜ and 53ᶜ to its medium speed position than for shifting the belt from its medium speed position to its high speed position following a shifting of the belt from its low speed position to its medium speed position. The shifter position determining means including the lever 71 determines greater movement of the actuating means including the disc 62 and pin 64 when the shifters are moved to shift the belt in a direction opposite to that in which it was last shifted than when moved to shift the belt in the same direction as that in which it was last shifted. It is due to this that the movements imparted to the shifter arms 58, 60 are adjusted or controlled automatically according to the presence or absence of clearances between the shifter fingers and the belt.

The mechanism disclosed embodies the invention in a preferred form, but it is intended that the disclosure be illustrative rather than definitive, the invention being defined in the appended claims.

I claim:

1. Variable speed driving mechanism comprising a stepped power driven pulley having adjacent concentric portions of smaller and larger diameters respectively;

a stepped drivable pulley having adjacent concentric portions of larger and smaller diameters respectively; means journalling said pulleys to rotate about spaced axes with the portions of smaller and larger diameters of said power driven pulley substantially aligned respectively with the portions of larger and smaller diameters of said drivable pulleys; an endless flexible belt embracing and operatively connecting aligned portions of said pulleys; a first shifter having a part engageable with said belt and an operating part movable for operating said first shifter to cause shifting said belt from one of said pulley portions of one of said pulleys to the other of said pulley portions of said one of said pulleys; a second shifter having a part engageable with said belt and an operating part movable for operating said second shifter to cause shifting said belt from one of said pulley portions of the other of said pulleys to the other of said pulley portions of said other of said pulleys, the operating parts of said first and second shifters extending alongside of and overlapping each other; and equipment for operating said shifters including a rockable member, a pin on said rockable member extending between the overlapping operating parts of said first and second shifters and being movable in opposite directions in response to rocking of said rockable member in opposite directions for selectively moving said first shifter relatively positively for shifting said belt from the larger diameter portion of one of said pulleys to the smaller diameter portion thereof and for moving said second shifter relatively positively for shifting said belt from the larger diameter portion of the other of said pulleys to the smaller diameter portion thereof, and resilient means urging each of said shifters to move in the direction opposite to the direction in which it is movable relatively positively by said pin.

2. Variable speed driving mechanism comprising a stepped power driven pulley having adjacent concentric portions of smaller and larger diameters respectively; a stepped drivable pulley having adjacent concentric portions of larger and smaller diameters respectively; means journalling said pulleys to rotate about spaced axes with the portions of smaller and larger diameters of said power driven pulley substantially aligned respectively with the portions of larger and smaller diameters of said drivable pulley; an endless flexible belt embracing and operatively connecting aligned portions of said pulleys; a first shifter arm; means mounting said first shifter arm to rock about an axis fixed with respect to the axes of said pulleys, said first shifter arm having a part engageable with said belt adjacent to one of said pulleys and an operating part extending from the pivotal axis of said arm towards the other of said pulleys; a second shifter arm; means mounting said second shifter arm to rock about an axis fixed with respect to the axes of said pulleys, said second shifter arm having a part engageable with said belt adjacent to said other of said pulleys and an operating part extending from the pivotal axis of said second shifter arm towards said one of said pulleys and overlapping the operating part of said first shifter arm; and means for operating said shifters oppositely including an element extending between the overlapping operating parts of said shifter arms and being movable in opposite directions for selectively moving said first shifter arm relatively positively in one direction for shifting said belt from the larger diameter portion of one of said pulleys to the smaller diameter portion thereof and for moving said second shifter arm relatively positively in the opposite direction for shifting said belt from the larger diameter portion of the other of said pulleys to the smaller diameter portion thereof, and a spring connection between said shifter arms operable irrespective of which one of said shifter arms is moved relatively positively in one direction for relatively impositively moving the other of said shifter arms in the opposite direction.

3. Variable speed driving mechanism comprising a stepped power driven pulley having adjacent concentric portions of smaller and larger diameters respectively; a stepped drivable pulley having adjacent concentric portions of larger and smaller diameters respectively; means journalling said pulleys to rotate about spaced axes with the portions of smaller and larger diameters of said power driven pulley substantially aligned respectively with the portions of larger and smaller diameters of said drivable pulley; an endless flexible belt embracing and operatively connecting aligned portions of said pulleys; a first shifter arm; means mounting said first shifter arm to rock about an axis fixed with respect to the axes of said pulleys, said first shifter arm having a part engageable with said belt adjacent to one of said pulleys and an operating part extending from the pivotal axis of said arm towards the other of said pulleys; a second shifter arm; means mounting said second shifter arm to rock about an axis fixed with respect to the axes of said pulleys, said second shifter arm having a part engageable with said belt adjacent to said other of said pulleys and an operating part extending from the pivotal axis of said second shifter arm towards said one of said pulleys and overlapping the operating part of said first shifter arm; and means for operating said shifters oppositely including an element extending between the overlapping operating parts of said shifter arms and being movable in opposite directions for selectively moving said first shifter arm relatively positively in one direction for shifting said belt from the larger diameter portion of one of said pulleys to the smaller diameter portion thereof and for moving said second shifter arm relatively positively in the opposite direction for shifting said belt from the larger diameter portion of the other of said pulleys to the smaller diameter portion thereof, and a coiled tensile spring interconnecting the overlapping operating parts of said shifter arms and being operable irrespective of which one of said shifter arms is moved relatively positively in one direction for relatively impositively moving the other of said shifter arms in the opposite direction.

4. A construction as set forth in claim 3 in which each of said pulleys includes a portion of intermediate diameter between its portions of smaller and larger diameters, the intermediate diameter portions of said pulleys being aligned with each other.

5. A construction as set forth in claim 3 in which said means for operating said shifters includes a rockable member and in which said element extending between the overlapping operating parts of said shifter arms is constituted by a pin carried by said rockable member.

6. Variable speed driving mechanism comprising a stepped power driven pulley having concentric end portions respectively of smaller and larger diameters and a central portion of intermediate diameter; a stepped drivable pulley having concentric end portions respectively of larger and smaller diameters and a central portion of intermediate diameter; means journalling said pulleys to rotate about spaced axes with their intermediate diameter portions substantially aligned with each other and with the portions of smaller and larger diameters of said power driven pulley substantially aligned respectively with the portions of larger and smaller diameter of said drivable pulley; an endless flexible belt embracing and operatively connecting aligned portions of said pulleys; a first shifter engageable with one edge of said belt and being movable in one direction for shifting said belt from the larger diameter portion of said drivable pulley to the intermediate diameter portion thereof and thence to the smaller diameter portion thereof; a second shifter engageable with the opposite edge of said belt and being movable in the opposite direction for shifting said belt from the larger diameter portion of said power driven pulley to the intermediate diameter portion thereof and thence to the smaller diameter portion thereof; actuating means for moving said first shifter in said one direction and for moving said second shifter in said opposite direction; and shifter position determining means operatively connected to said actuating means for determining greater movement of said actuating means and said shifters when either of the latter is moved to shift said belt in a direction opposite to the direction in which it was last shifted than when moved to shift said belt in the same direction as that in which it was last shifted.

7. Variable speed driving mechanism comprising a stepped power driven pulley having concentric end portions respectively of smaller and larger diameters and a central portion of intermediate diameter; a stepped drivable pulley having concentric end portions respectively of larger and smaller diameters and a central portion of intermediate diameter; means journalling said pulleys to rotate about spaced axes with their intermediate diameter portions substantially aligned with each other and with the portions of smaller and larger diameters of said power driven pulley substantially aligned respectively with the portions of larger and smaller diameter of said drivable pulley; an endless flexible belt embracing and operatively connecting aligned portions of said pulleys; a first shifter engageable with one edge of said belt and being movable in one direction for shifting said belt from the larger diameter portion of said drivable pulley to the intermediate diameter portion thereof and thence to the smaller diameter portion thereof; a second shifter engageable with the opposite edge of said belt and being movable in the opposite direction for shifting said belt from the larger diameter portion of said power driven pulley to the intermediate diameter portion thereof and thence to the smaller diameter portion thereof; actuating means for moving said first shifter in said one direction and for moving said second shifter in said opposite direction; a control member for operating said actuating means; and differentially operable detent mechanism for determining greater movement of said control member, said actuating means and said shifters when either of the latter is moved to shift said belt in a direction opposite to the direction in which it was last shifted than when moved to shift said belt in the same direction as that in which it was last shifted.

8. Variable speed driving mechanism comprising a stepped power driven pulley having concentric end portions respectively of smaller and larger diameters and a central portion of intermediate diameter; a stepped drivable pulley having concentric end portions respectively of larger and smaller diameters and a central portion of intermediate diameter; means journalling said pulleys to rotate about spaced axes with their intermediate diameter portions substantially aligned with each other and with the portions of smaller and larger diameters of said power driven pulley substantially aligned respectively with the portions of larger and smaller diameter of said drivable pulley; an endless flexible belt embracing and operatively connecting aligned portions of said pulleys; a first shifter engageable with one edge of said belt and being movable in one direction for shifting said belt from the larger diameter portion of said drivable pulley to the intermediate diameter portion thereof and thence to the smaller diameter portion thereof; a second shifter engageable with the opposite edge of said belt and being movable in the opposite direction for shifting said belt from the larger diameter portion of said power driven pulley to the intermediate diameter portion thereof and thence to the smaller diameter portion thereof; actuating means for moving said first shifter in said one direction and for moving said second shifter in said opposite direction; a control member for operating said actuating means; a detent having seats engageable with said control member for determining three positions thereof corresponding respectively to said belt's engaging the portions of larger, intermediate and smaller diameters of said power driven pulley and the respectively substantially aligned portions of said drivable pulley; and means mounting said detent for limited bodily movement only when said control member is operated to effect movement of either of said shifters to shift said belt in a direction opposite to that in which said belt was last shifted, said detent being not bodily movable when said control member is operated to effect movement of either of said shifters to shift said belt in the same direction as that in which it was last shifted.

9. Variable speed driving mechanism comprising a stepped power driven pulley having concentric end portions respectively of smaller and larger diameters and a central portion of intermediate diameter; a stepped drivable pulley having concentric end portions respectively of larger and smaller diameters and a central portion of intermediate diameter; means journalling said pulleys to rotate about spaced axes with their intermediate diameter portions substantially aligned with each other and with the portions of smaller and larger diameters of said power driven pulley substantially aligned respectively with the portions of larger and smaller diameter of said drivable pulley; an endless flexible belt embracing and operatively connecting aligned portions of said pulleys; a first shifter engageable with one edge of said belt and being movable in one direction for shifting said belt from the larger diameter portion of said drivable pulley to the intermediate diameter portion thereof and thence to the smaller diameter portion thereof; a second shifter engageable with the opposite edge of said belt and being movable in the opposite direction for shifting said belt from the larger diameter portion of said power driven pulley to the intermediate diameter portion thereof and thence to the smaller diameter portion thereof; actuating means for moving said first shifter in said one direction and for moving said second shifter in said opposite direction; a control member for operating said actuating means; a detent having seats engageable with said control member for determining three positions thereof corresponding respectively to said belt's engaging the portions of larger, intermediate and smaller diameters of said power driven pulley and the respectively substantially aligned portions of said drivable pulley; and means including a pin and slot connection mounting said detent for limited bodily movement only when said control member is operated to effect movement of either of said shifters to shift said belt in a direction opposite to that in which said belt was last shifted, said detent being not bodily movable when said control member is operated to effect movement of either of said shifters to shift said belt in the same direction as that in which it was last shifted.

10. Variable speed driving mechanism comprising a stepped power driven pulley having concentric end portions respectively of smaller and larger diameters and a central portion of intermediate diameter; a stepped drivable pulley having concentric end portions respectively of larger and smaller diameters and a central portion of intermediate diameter; means journalling said pulleys to rotate about spaced axes with their intermediate diameter portions substantially aligned with each other and with the portions of smaller and larger diameters of said power driven pulley substantially aligned respectively with the portions of larger and smaller diameter of said drivable pulley; an endless flexible belt embracing and operatively connecting aligned portions of said pulleys; a first shifter engageable with one edge of said belt and being movable in one direction for shifting said belt from the larger diameter portion of said drivable pulley to the intermediate diameter portion thereof and thence to the smaller diameter portion thereof; a second shifter engageable with the opposite edge of said belt and being movable in the opposite direction for shifting said belt from the larger diameter portion of said power driven pulley to the intermediate diameter portion thereof and thence to the smaller diameter portion thereof; actuating means for moving said first shifter in said one direction and for moving said second shifter in said opposite direction; a control member for operating said actuating means; a detent lever having seats engageable with said control member for determining said belt's engaging the portions of larger, intermediate, and smaller diameters of said power driven pulley; a pivot on which said detent lever is rockable; a spring for maintaining said detent lever and said operating member in engagement but being yieldable to permit rocking of said detent lever and movement of said operating member from seat to seat on said detent lever; and a slot in said detent lever through which said pivot extends to provide a pin and slot connection enabling said detent lever to move substantially linearly only when said control member is operated to effect movement of either of said shifters to shift said belt in a direction opposite to that in which it was last shifted and not when said control member is operated to effect movement of either of said shifters to shift said belt in the same direction as that in which it was last shifted.

11. Variable speed driving mechanism comprising a stepped power driven pulley having concentric end portions respectively of smaller and larger diameters and a central portion of intermediate diameter; a stepped drivable pulley having concentric end portions respectively of larger and smaller diameters and a central portion of intermediate diameter; means journalling said pulleys to rotate about spaced axes with their intermediate diameter portions substantially aligned with each other and with the portions of smaller and larger diameters of said power driven pulley substantially aligned respectively with the portions of larger and smaller diameter of said drivable pulley; an endless flexible belt embracing an operatively connecting aligned portions of said pulleys; a first shifter engageable with one edge of said belt and being movable in one direction for shifting said belt from the larger diameter portion of said drivable pulley to the intermediate diameter portion thereof and thence to the smaller diameter portion thereof; a second shifter engageable with the opposite edge of said belt and being movable in the opposite direction for shifting said belt from the larger diameter portion of said power driven pulley to the intermediate diameter portion thereof and thence to the smaller diameter portion thereof; actuating means for moving said first shifter in said one direction and for moving said second shifter in said opposite direction; a control member for operating said actuating means; a detent lever having seats engageable with said control member for determining three positions thereof corresponding to said belt's engaging the portions of larger, intermediate, and smaller diameters of said power driven pulley; a pivot on which said detent lever is rockable; a spring for maintaining said detent lever and said operating member in engagement but being yieldable to permit rocking of said detent lever and movement of said operating member from seat to seat on said detent lever; and a slot in said detent lever through which said pivot extends to provide a pin and slot connection enabling said detent lever to move substantially linearly only when said control member is operated to effect movement of either of said shifters to shift said belt in a direction opposite to that in which it was last shifted and not when said control member is operated to effect movement of either of said shifters to shift said belt in the same direction as that in which it was last shifted, said slot extending generally transversely to the line of action of said spring and being of kidney shape whereby yielding to resist although to permit substantially linear movement of said detent lever.

12. Variable speed driving mechanism comprising a stepped power driven pulley having concentric end portions respectively of smaller and larger diameters and a central portion of intermediate diameter; a stepped drivable pulley having concentric end portions respectively of larger and smaller diameters and a central portion of intermediate diameter; means journalling said pulleys to rotate about spaced axes with their intermediate diameter portions substantially aligned with each other and with the portions of smaller and larger diameters of said power driven pulley substantially aligned respectively with the portions of larger and smaller diameter of said drivable pulley; an endless flexible belt embracing and operatively connecting aligned portions of said pulleys; a first shifter engageable with one edge of said belt and being movable in one direction for shifting said belt from the larger diameter portion of said drivable pulley to the intermediate diameter portion thereof and thence to the smaller diameter portion thereof; a second shifter engageable with the opposite edge of said belt and being movable in the opposite direction for shifting said belt from the larger diameter portion of said power driven pulley to the intermediate diameter portion thereof and thence to the smaller diameter portion thereof; actuating means for moving said first shifter in said one direction and for moving said second shifter in said opposite direction; a control member for operating said actuating means; a detent lever having three spaced seats engageable with said control member for determining respectively three positions thereof corresponding to said belt's engaging the portions of larger, intermediate, and smaller diameters of said power driven pulley; a pivot on which said detent lever is rockable; a spring for maintaining said detent lever and said operating member in engagement but being yieldable to permit rocking of said detent lever and movement of said operating member from seat to seat on said detent lever; and a slot in said detent lever extending generally in the direction of spacing of said seats and through which said pivot extends to provide a pin and slot connection enabling said detent lever to move substantially linearly only when said control member is operated to effect movement of either of said shifters to shift said belt in a direction opposite to that in which it was last shifted and not when said control member is operated to effect movement of either of said shifters to shift said belt in the same direction as that in which it was last shifted.

13. In a belt shifting means for a variable speed driving mechanism of the kind including a power driven pulley and a drivable pulley each having pulley portions of smaller, intermediate, and larger diameters with the intermediate diameter portions of the two pulleys substantially aligned and with the smaller and larger diameter portions of one of said pulleys substantially aligned respectively with the larger and smaller diameter portions of the other of said pulleys, and a belt embracing selected aligned portions of said pulleys, the combination of a first shifter engageable with one edge of the belt and being movable in one direction for shifting the belt from the larger diameter portion of said drivable pulley to the intermediate diameter portion thereof and thence to the smaller diameter portion thereof; a second shifter engageable with the opposite edge of the belt and being movable in the opposite direction for shifting the belt from the larger diameter portion of said power driven pulley to the intermediate diameter portion thereof and thence to the smaller diameter portion thereof; actuating means for moving said first shifter in said one direction and for moving said second shifter in said opposite direction; and shifter position determining means operatively connected to said actuating means for determining greater movement of said actuating means and said shifters when either of the latter is moved to shift the belt in a direction opposite to the direction in which it was last shifted than when moved to shift said belt in the same direction as that in which it was last shifted.

14. In a belt shifting means for a variable speed driving mechanism of the kind including a power driven pulley and a drivable pulley each having pulley portions of smaller, intermediate, and larger diameters with the intermediate diameter portions of the two pulleys substantially aligned and with the smaller and larger diameter portions of one of said pulleys substantially aligned respectively with the larger and smaller diameter portions of the other of said pulleys, and a belt embracing selected aligned portions of said pulleys, the combination of a first shifter engageable with one edge of the belt and being movable in one direction for shifting the belt from the larger diameter portion of said drivable pulley to the intermediate diameter portion thereof and thence to the smaller diameter portion thereof; a second shifter engageable with the opposite edge of the belt and being movable in the opposite direction for shifting the belt from the larger diameter portion of said power driven pulley to the intermediate diameter portion thereof and thence to the smaller diameter portion thereof; actuating means for positively moving said first shifter in said one direction and for positively moving said second shifter in said opposite direction; spring means urging each of said shifters to move in a direction opposite to that in which it is movable positively by said actuating means; and shifter position determining means operatively connected to said actuating means for determining greater movement of said actuating means and said shifters when either of the latter is moved to shift the belt in a direction opposite to the direction in which it was last shifted than when moved to shift said belt in the same direction as that in which it was last shifted.

15. In a belt shifting means for a variable speed driving mechanism of the kind including a power driven pulley and a drivable pulley each having pulley portions of smaller, intermediate, and larger diameters with the intermediate diameter portions of the two pulleys substantially aligned and with the smaller and larger diameter portions of one of said pulleys substantially aligned respectively with the larger and smaller diameter portions of the other of said pulleys, and a belt embracing selected aligned portions of said pulleys, the combination of two shifter parts respectively projecting alongside opposite edges of said belt and being spaced from each other a distance greater than the width of the belt whereby when one of said shifter parts engages the adjacent edge of the belt there is clearance between the other of said shifter parts and the edge of said belt adjacent thereto and when said other of said shifter parts engages the adjacent edge of said belt there is a clearance between said one of said shifter parts and the edge of the belt adjacent thereto; actuating means for operating said shifter parts for causing said one of said shifter parts to shift said belt in one direction axially of said pulleys and for operating said shifter parts for causing said other of said shifter parts to shift said belt in the opposite direction axially of said pulleys; and shifter position determining means operatively connected to said actuating means for determining greater movement of said actuating means and said shifter parts when shifting said belt in a direction opposite to that in which it was last shifted than when shifting said belt in the same direction as that in which it was last shifted.

References Cited in the file of this patent
UNITED STATES PATENTS

| 1,283,625 | Bancroft | Nov. 5, 1918 |

FOREIGN PATENTS

| 586,776 | Great Britain | Mar. 31, 1947 |